United States Patent
Brüderle et al.

(10) Patent No.: US 6,634,604 B2
(45) Date of Patent: Oct. 21, 2003

(54) METHOD FOR OPERATION OF A ROTATING SPACE VEHICLE WITH VARYING ROTATION

(75) Inventors: Ernst Brüderle, Bad Tölz (DE); Raoul Kieffer, München (DE)

(73) Assignee: Astrium GmbH Earth Observation and Science Div., Munich (DE)

(*) Notice: Subject to any disclaimer, the term of this patent is extended or adjusted under 35 U.S.C. 154(b) by 103 days.

(21) Appl. No.: 10/104,058

(22) Filed: Mar. 22, 2002

(65) Prior Publication Data

US 2002/0171010 A1 Nov. 21, 2002

(30) Foreign Application Priority Data

Mar. 22, 2001 (DE) .......................... 101 14 085

(51) Int. Cl.[7] .............................. B64G 1/24; B64G 1/44
(52) U.S. Cl. ...................... 244/173; 244/165; 701/13
(58) Field of Search ................. 244/158 A, 164, 244/165, 169, 173; 701/13

(56) References Cited

U.S. PATENT DOCUMENTS

| | | | | |
|---|---|---|---|---|
| 4,909,460 A | * | 3/1990 | Moura et al. | 244/164 |
| 5,816,540 A | * | 10/1998 | Murphy et al. | 244/173 |
| 6,017,003 A | | 1/2000 | Mullins | 244/173 |
| 6,102,336 A | * | 8/2000 | Cande | 244/168 |
| 6,102,339 A | | 8/2000 | Wu et al. | 244/173 |
| 6,474,602 B1 | * | 11/2002 | Mcvey | 244/173 |

FOREIGN PATENT DOCUMENTS

| | | |
|---|---|---|
| DE | 19544641 | 11/1995 |
| JP | 11152096 | 6/1999 |

OTHER PUBLICATIONS

English Abstract of JP 11152096 dated Jun. 8, 1999.
NASA TN D—1904; Theoretical Considerations for a Preliminary Design of a Solar Cell Generator on a Satellite; Von Bernard J. Saint–Jen: 1963.

* cited by examiner

Primary Examiner—Robert P. Swiatek
(74) Attorney, Agent, or Firm—Ladas & Parry

(57) ABSTRACT

A method for operating a space vehicle equipped with at least one device cooperating with a celestial body, wherein rotation of the space vehicle takes place around at least one axis of the space vehicle. The rotation of the space vehicle is slowed when the device cooperating with the celestial body is oriented substantially toward the celestial body. The device can be a solar panel intended to face the sun and produce electrical energy.

12 Claims, 2 Drawing Sheets

METHOD FOR OPERATION OF A ROTATING SPACE VEHICLE WITH VARYING ROTATION

FIELD OF THE INVENTION

The present invention relates to a method of operation of a space vehicle equipped at least with one device cooperating with a celestial body, wherein rotation of the space vehicle takes place around at least one axis of the space vehicle.

BACKGROUND AND PRIOR ART

Such space vehicles, for example satellites, have long been known, for example Japanese Patent 1115096, which describes a method for imparting rotation (spin) to a satellite by means of spin wheels.

One problem in the operation of satellites in orbit is optimal energy collection by means of solar generators. For this purpose the satellites are usually equipped with at least one solar-generator surface which can be disposed either directly on the satellite body or can be in the form of deployable solar-generator panels. One difficulty in energy collection by means of such solar generators is in the optimal orientation of the solar-generator surface toward the sun.

This is addressed in U.S. Pat. No. 6,017,003 in which a natural rotation of the satellites of 360° per orbit is produced, in order to keep the solar generators oriented toward the sun at all times and thereby to guarantee a maximum of energy collection. On the other hand, constant orientation toward the sun of the surfaces of the satellite, and the solar generators in particular, also leads to intense heating of the corresponding surfaces, especially the solar-generator surfaces. It has been found that excessive heating of the solar generators impairs their power output.

The problem of heating due to incident solar radiation is disclosed, for example, in U.S. Pat. No. 6,102,339, and a solution is proposed of using radiation-shielding devices which, however, increase the satellite mass unnecessarily and complicate the entire satellite structure.

German Patent 19544641 describes the problem of the thermal cycles caused in earth satellites due to alternating light and dark phases and the associated thermomechanical loads for solar generators. In this patent, such loads are intended to be compensated by appropriately improved electrical conductors.

B. J. Saint-Jean, in "Theoretical considerations for a preliminary design of a solar cell generator on a satellite", NASA TN D-1904, 1963, also describes the thermal cycles that occur in rotating satellites.

Similar problems pertaining to optimal orientation of a space-vehicle device which cooperates with a celestial body can also be encountered. For example, in connection with communication devices of the space vehicle that communicate with corresponding transmitting and/or receiving devices on a celestial body such as the earth, or even in measuring and observing devices, which are used to survey or observe certain celestial bodies.

SUMMARY OF THE INVENTION

An object of the present invention is to obtain the optimal use of space-vehicle devices that cooperate with a celestial body. For possible application to solar generators, the objective is then to collect a high yield of energy from the solar radiation incident on the space vehicle while avoiding the disadvantages of the prior art.

This object is achieved according to the invention by a method for operation of a space vehicle, wherein the space vehicle is equipped at least with one device cooperating with a celestial body. In the method rotation of the space vehicle around at least one axis of the space vehicle is imposed, as has already been long known in the prior art for satellites. It is now provided, however, that the rotation takes place not uniformly but instead the rotation of the space vehicle is slowed when the device cooperating with the celestial body is oriented substantially toward the celestial body. In this way, there is obtained a rotation of the space vehicle with different rates of rotation depending on or whether an appropriate device of the space vehicle is substantially oriented toward the celestial body with which it is supposed to cooperate, or whether it is facing away therefrom. If a plurality of identically acting devices or different devices cooperating with different celestial bodies are disposed on the space vehicle, slowing of the rotation can be achieved whenever one such device is oriented substantially toward the corresponding celestial body. The word "substantially" as used here means that slowing does not have to take place only when the device is exactly oriented toward the celestial body, but instead, as is already necessary for reasons of reduction to practice, it is provided that slowing of the rotation takes place in a certain angular range around this exact orientation, or in other words around the line connecting the space vehicle and the center of the celestial body, for example, in a range of −45° to +45°, although the deviation can also correspond to smaller angular ranges, such as 30° or 15°, or even a range smaller than 10°. This will also have to be adapted to the solid-angle region occupied by the celestial body as viewed from the space vehicle.

By this method, there is achieved a combination of the advantages of rotation of the space vehicle around a body axis and the advantages of longer orientation of the devices toward the corresponding celestial bodies with which they cooperate, achieved because of the slowed rotation in these intervals. Thus cooperation with the celestial body is optimized.

As already mentioned, the devices cooperating with a celestial body can be, for example, as solar-generator surfaces, communication devices, or measuring or observing devices. The space vehicle can be designed, for example, as a satellite traveling in an orbit, or else as a space probe or any other type of space vehicle.

For the special application of the inventive method with regard to at least one solar-generator surface of the space vehicle, it is provided that the rotation is slowed when the normal to at least one solar-generated surface is oriented substantially toward the sun. If, however, the normal to the solar-generator surface is always inclined by a particular angular value relative to the line connecting the space vehicle and the sun during rotation, or in other words if, in particular, the axis of rotation of the space vehicle is not perpendicular to the line connecting the space vehicle and the sun, slowing of the rotation takes place when the projection of the normal to the solar-generator surface onto the plane connecting the space vehicle and the sun is oriented substantially toward the sun. In this way, the cooperation with the celestial body, which takes place here through the energy output, can also be optimized for these cases. Compared with uniform rotation, there can be achieved slowed, intensive irradiation of the full solar-generator surface, thus avoiding excessive heating of the solar-generator surfaces by the rotation of the space vehicle, which produces respective cycles of irradiation and showed condition for the individual solar-generator surface.

This method can be applied for solar generators in particular if the solar-generator surface is formed by solar-generator panels that are not deployed or are only partly deployed. In such a case, it is particularly difficult to provide the necessary energy for the space vehicle, and so optimal utilization of the incident solar radiation is of great importance for energy collection For all of the foregoing cases it can be provided that the rotation is slowed by means of spin wheels. In principle, jets or similar thrustors or other space-vehicle actuators with equivalent effect can also be used for this purpose, although precisely for the case of thrusters the anticipated fuel consumption would usually be relatively high.

DETAILED DESCRIPTION

Figure 1:
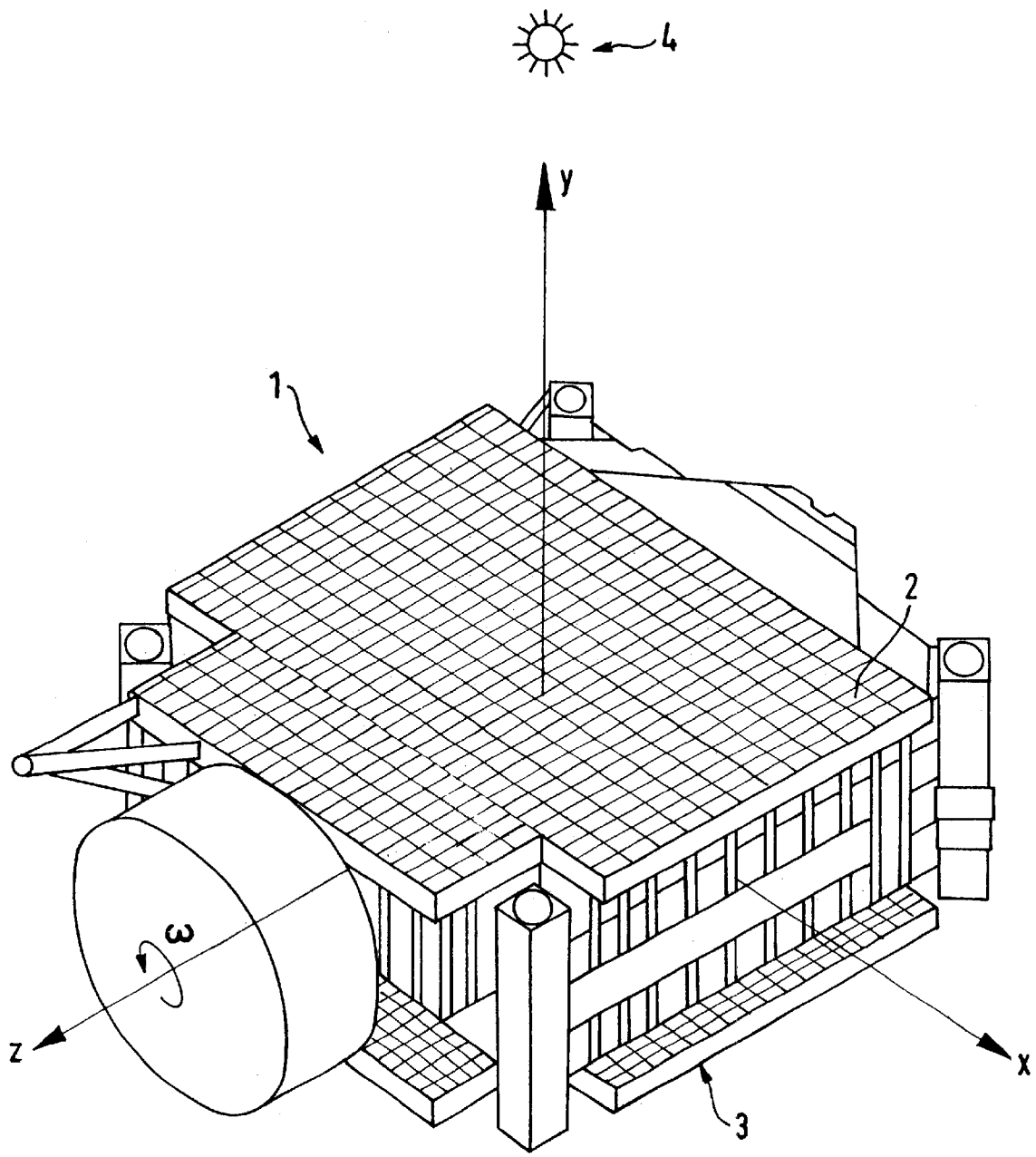
FIG. 1 is a schematic diagram of a rotating satellite with non-deployed solar generators.

The special case of a rotating satellite, illustrated by way of example in FIG. 1, will now be described Therein satellite 1 is illustrated having three axes x, y, z, and it rotates with angular velocity $\omega$ around axis z. Satellite 1 is equipped with two solar generators 2, 3, which are disposed on opposite sides of satellite 1. Solar generators 2, 3 are illustrated in a non-deployed condition in FIG. 1, and a line normal to solar generators 2, 3 then coincides with the positive or negative y-axis. FIG. 1 shows an instantaneous position of the rotation, in which the y-axis and thus the normal solar generator 2 is oriented precisely toward the sun 4.

In a satellite, the solar generators are usually initially retracted and are deployed only after separation from the launching rocket. For the case in which deployment problems occur the ground station must investigate in order to achieve current deployment, or to determine that deployment can be achieved only at a later time, such as in final orbit. The satellite needs enough energy to keep its thermal balance stable and to be able to operate the instruments or other systems necessary for attitude control. The energy stored in the battery is generally not sufficient to satisfy this need. It is therefore necessary to collect energy with the generators which are still retracted. As illustrated in FIG. 1, the satellite can be regarded in general as a rectangular block, in which part of the retracted solar generator points outward on two opposite sides. Two methods are known for generating energy in this configuration:

- one solar-generator face is oriented with its normal toward the sun and this orientation is maintained,
- after orientation in the manner described above, the satellite is allowed to rotate around an axis perpendicular to the normal to the solar generator.

The power is represented by $$P=P_0(1-a)\cos\Phi$$

where $P_0$: power at temperature 0° C. and direction of the sun equal to direction of the normal to the solar generator, in watts [W]

T: temperature of the solar generator, degrees Celsius [° C.]

$\Phi$: angle between direction to the sun and normal to the solar generator a: a constant, a=0.00364 [W/°C.]

Both of the methods cited hereinabove now have a disadvantage: In the first method, the temperature of the solar generator pointing toward the sun rises continuously due to the permanent solar irradiation, thus leading to a power drop. In the second method, the mean temperature of the solar generators is lower by virtue of the rotation at $$\phi=\omega t$$

where $\omega$ is the rotational frequency of the satellite and t is the time, but the optimal angle of incidence relative to the sun is not always achieved.

If, disregarding eclipse phases, it is assumed that the side of the satellite facing the sun absorbs as much heat as the side facing away from the sun dissipates it, the temperature of the two solar generators can be described very roughly as follows for relatively short shadow/sun intervals up to about 30 minutes.

For the solar generator facing the sun:

$$T=T_0+(-50°-T_0)(1-\exp(-0.0025(t-t_0))$$

where $T_0$ is the respective solar-generated temperature at time $t_0$.

Without loss of generality, it can be assumed for the following analyses that the temperature of both solar generators was 0° C. for $t_0=0$. It is further assumed that the sun is positioned exactly in the -x-direction, meaning that $\phi(t_0)=90°$ and a positive rotation around the z-axis brings solar generator 2 directly into the sun and solar generated 3 into shadow.

During periodic motion of the satellite, a periodic temperature variation of both solar generators, wherein one of the solar generators has a phase shift of one half period, is established after a short period of time. The extreme values of the temperature variation for a full period D are given by the expressions $$-T_0=T_0+(50-T_0)(1-\exp(-0.0025D/2))$$

or $$T_0=50(2/c-1) \text{ and } T_0=-50/(2/c-1)$$

where $$c=1-\exp(-0.0025D/2)$$

Using the above expressions we will next consider the operation of the solar generator according to the prior art and the present invention.

1. Case according to the prior art

The satellite rotates around the z-axis at a constant angular velocity $\omega$. The period of one rotation of the satellite it then $$D=2\pi/\omega$$

Thus, for a rate of rotation $\omega=1°/\text{sec}$, D=360 sec.

For this case the temperature fluctuate between −11.1° C. and +11.1° C. Hereinafter, only one solar generator is considered at any time, since the solar-generated power, in common with the temperature variation, is also periodic.

The mean power obtained from the solar generators is expressed by $$P = P_0 2/D \int_0^{D/2} (1 - a50 + a61.1\exp(-0.0025t))\text{abs}(\cos\omega t - \pi/2)\,dt$$

a=0.0025

$P=P_0\{(1-a50)2/p-2a61.1/D\ [\exp(-at)(\omega\cos wt+\alpha a\sin\omega t)/(\alpha^2+\omega^2)]_0^{D/2}\}$ $P=P_0(0.521-0.00124\ [-0.0111-0.0175]/3.108\ 10^{-4}$ $P=P_0(0.521-0.114)=0.635 P_0$ Thus the power is considerably lower than $P_o$ 2. Case according to the prior art.

If the satellite were not to be rotated around the z-axis, but instead a solar generator were to be oriented directly toward the sun, the optimal orientation toward the sun would be achieved permanently. In the case of permanent perpendicular orientation toward the sun, however, the rough temperature model that predicts a steady-state temperature of 50° C. would no longer be valid. In reality, the temperature would rise up to 120° C.

The power obtained from the solar generator would then be $P=P_0(1-a120)=0.5632\ P_0$ or in other words even smaller than in the previous case with a constant rate of rotation.

It is evident that the power losses in the two aforesaid cases are caused on the one hand by the unfavorable mean angle of incidence relative to the sun and on the other hand by the elevated temperature.

3. According to the invention, however, it is now provided that the rate of rotation of the satellite is varied. Satellite 1 is rotated as before around the z-axis with a rate of rotation $\omega_0$ at the positions $\phi=0°$ and $\phi=180°$. Thus when incidence of the sun relative to the solar generators is perpendicular, the rotation is pauded for a time Z. The duration of a period is then $U=2Z+D$ For the three cases of U=12 minutes, U=24 minutes and U=48 minutes, the resulting mean power will be calculated below.

Figure 2:
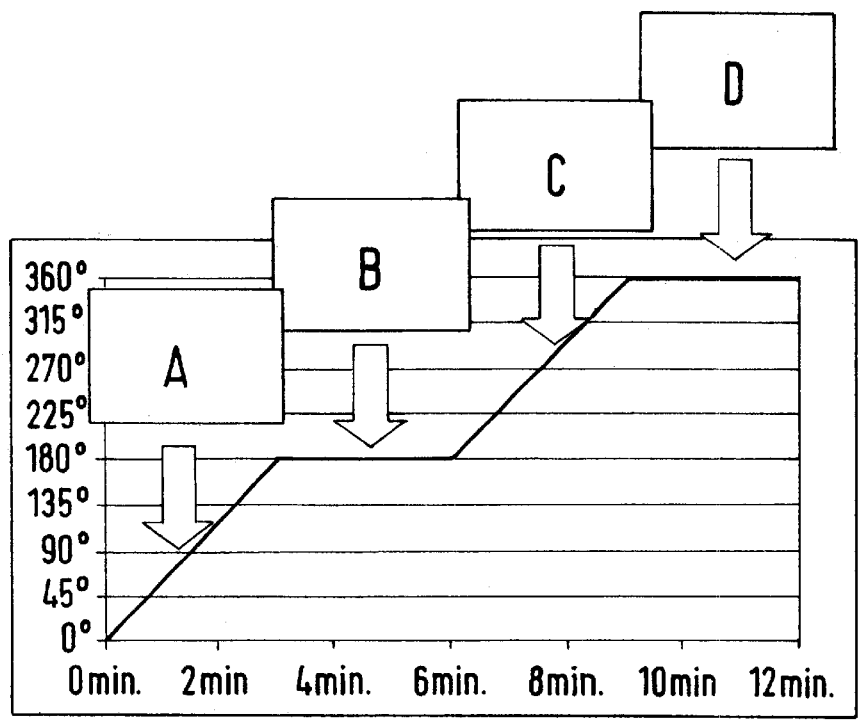
FIG. 2 diagrammatically illustrates an idealized variation of the rotation of a satellite.
Figure 3:
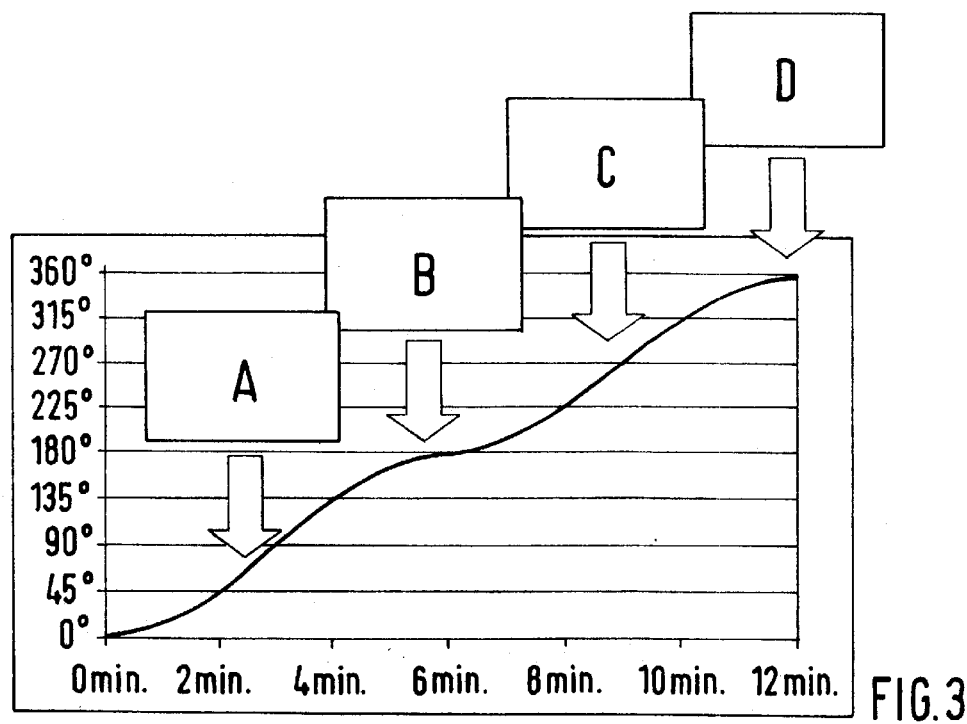
FIG. 3 diagrammatically illustrates a practical variation of the rotation of a satellite.

For the three case with U=12 minutes, which is also illustrated in FIGS. 2 and 3, the satellite is therefore turned from 0° to 180° in phase A and from 180° to 360° in phase C within 3 minutes in each case, and it remains oriented perpendicularly toward the sun for 3 minutes each in phases B and D. In this connection, FIG. 2 shows the idealized sequence, in which only the angular velocities $\omega=\omega_0$ and $\omega=0$ occur. In contrast, FIG. 3 shows a realistic variation in which the rotation is gradually slowed to $\omega=0$ in the region of 0° and 180° (phases B and D) and is then gradually accelerated once again after passing beyond the angles 0° and 180° (phases A and C) thereby smoothly and without abrupt velocity changes.

For this case the temperatures fluctuates between −21.1° C. and +21.1° C. To calculate the mean power, the following parameters are determined.

the value from rotation −90° to 0° (duration 90 seconds)

$$P_1 = P_0 2/U \int_0^{90} (1 - a50 + a71.1\exp(-0.0025t))\text{abs}(\cos\omega t - \pi/2)\,dt$$

$$P_1 = P_0 2/U \int_0^{90} (1 - a50 + a71.1\exp(-0.0025t))\text{abs}(\sin\omega t)\,dt$$

$P1=P_0\{0.188-2a71.1/U[\exp(-a^2+w^2)]_0^{90}\}$ $P1=P_0(0.188-7.189\ 10^{-4}(0.002-0.0175)/3.108\ 10^{-4})$ $P1=P_0(0.13+0.036)=0.166\ P_0$ the value from orientation at 0° (duration 180 seconds)

$$P_2 = P_0 2/U \int_{90}^{270} (1 - a50 + a71.1\exp(-0.0025t))\,dt$$

$P_2=P_0 2/U\ (147.24-103.52(0.509-0.7985))=0.492\ P_0$ the value from rotation −0° to 90° (duration 90 seconds)

$$P_3 = P_0 2/U \int_{270}^{360} (1 - a50 + a71.1\exp(-0.0025t))\text{abs}(\cos\omega(t-270))\,dt$$

$P_3=P_0(0.188+2a71.1/U[\exp(\alpha t)(\omega\sin\omega)(t-270)-\alpha\cos\omega(t-270))/(\alpha^2+\omega^2)]_{270}^{360}\}]$ $P_3=P_0(0.13+7.189\ 10^{-4}(-0.001+0.00889)/3.108\ 10^{-4}))=0.148\ P_0$ From $P=P_1+P_2+P_3=P_0(0.166+0.492+0.148=0.806\ P_0$ it is evident that a much higher mean power can be obtained with the method of the invention.

The case in which U=24 minutes can be analyzed analogously. The influence of a longer duration of orientation perpendicular to the sun will be shown with this example. In this case the temperature of the solar generator fluctuates between −35.8° C. and +35.8° C.

The sum of the 3 different values is then given by:

$P=P_0(0.087+0.716+0.069=0.872\ P_0$

Thus, compared with a period of 12 minutes, a period of 24 minutes produces a somewhat higher solar-generator power.

Finally, the case in which U=48 minutes can be analyzed in the same way. This example is provided to show the influence of a relatively long duration of orientation perpendicular to the sun. In this case the solar-generator temperature fluctuates between −47.3° C. and +47.3° C.

The sum of the 3 different values is then given by:

$P=P_0(0.044+0.791+0.032=0.867\ P_0$

The influence of high temperature during excessively long orientation of a solar generator toward the sun is apparent here. Compared with the previous case, a drop of mean power is now obtained.

Consequently, the resulting power of solar generators can be influenced and optimized by a suitable choice of U and of the duration of irradiation of the solar generators.

What is claimed is:

1. A method of operating a space vehicle equipped with at least one device cooperating with a celestial body, said method comprising rotating the space vehicle around at least one axis of the space vehicle, with a non-uniform angular velocity in which the rotation of the space vehicle is slowed when the device cooperating with the celestial body is oriented substantially toward said celestial body.

2. The method according to claim 1, wherein the device is a communication device, a measuring device or an observing device and the rotation is slowed when said device is oriented substantially toward the celestial body.

3. The method according to claim 1, wherein said device comprises a solar generator and the celestial body is the sun, the rotation being slowed when a normal to a surface of said solar-generator is oriented substantially toward the sun.

4. The method according to claim 3, wherein the rotation of the space vehicle is slowed when the surface of the solar generator is formed by a solar generator panel, that is not deployed or is only partly deployed.

5. The method according to claim 4, wherein the solar generator is formed with one said solar panel on each opposite surface of the solar generator, and during a 360° rotation of the space vehicle each solar panel faces the sun during a period when the rotation is slowed.

6. The method according to claim 5, wherein after the period in which one of the solar panels faces the sun and the rotation of the space vehicle has been slowed, the space vehicle undergoes rapid rotation until the other of the solar panels faces the sun whereafter the rotation is again slowed.

7. The method according to claim 6, wherein the angular periods during which the rotation is slowed and increased are substantially equal.

8. The method according to claim 6, wherein the rotation is conducted relatively smoothly through said periods of slowdown and increase of speed without abrupt intervals.

9. The method according to claim 1, wherein the rotation is slowed by means of spin wheels.

10. The method according to claim 1, wherein the rotation is slowed in an angular range of −45° to +45° around a line connecting the space vehicle and the center of the celestial body.

11. The method according to claim 1, wherein the non-uniform angular velocity of the space vehicle includes a period in which rotation of the space vehicle is substantially diminished and a subsequent period in which the space vehicle undergoes greater rotational speed.

12. The method according to claim 11, in which the periods of slowdown and greater speed are substantially equal.

* * * * *